United States Patent
Thompson

[15] 3,675,743
[45] July 11, 1972

[54] HYDRAULIC DISC BRAKE CONSTRUCTION

[72] Inventor: Tom H. Thompson, 29210 Point-O-Woods Place, Southfield, Mich. 48075

[22] Filed: July 30, 1970

[21] Appl. No.: 59,538

[52] U.S. Cl..............................188/72.5, 92/164, 188/370
[51] Int. Cl.......................................................F16d 55/228
[58] Field of Search....................188/370, 72.4, 72.5; 92/164

[56] References Cited

UNITED STATES PATENTS 2,756,848  7/1956  Hillegass..............................188/72.5

FOREIGN PATENTS OR APPLICATIONS 716,067  9/1954  Great Britain..........................188/370
717,101  10/1954  Great Britain..........................188/370
951,754  3/1964  Great Britain..........................188/370

*Primary Examiner*—George E. A. Halvosa
*Attorney*—McGlynn, Reising, Milton & Ethington

[57] ABSTRACT

Hydraulic Disc Brake construction including a caliper body formed with a passage for hydraulic fluid. A cap member is mounted on a side surface of the caliper body and a passage for hydraulic fluid is formed in the cap member. A fluid connector projects between the caliper body and cap member to provide fluid communication between the caliper body passage and the passage in the cap member. The fluid connector has an endless side wall that projects into the main body with a loose fit and has an elastomeric sealing member bonded to its rim, the sealing member being compressed against the main body to provide a sealed fluid connection between the cap member and main body. The fluid connector may be mounted on the end cap prior to assembly of the end cap to the caliper body to serve as a locating member.

21 Claims, 5 Drawing Figures

PATENTED JUL 11 1972 3,675,743

INVENTOR.
Tom H. Thompson
BY
Barnard, McGlynn & Reising
ATTORNEYS

HYDRAULIC DISC BRAKE CONSTRUCTION

This invention relates generally to vehicle brake apparatus, and is particularly concerned with the construction of hydraulic disc brake apparatus for housing hydraulic actuators operable to apply braking pressure to the surfaces of a wheel-mounted brake disc.

In hydraulic disc brake systems for automobiles and other vehicles, braking pressure is applied to the surfaces of a disc mounted to rotate with a wheel of the vehicle. The braking pressure may be applied by hydraulic actuators mounted in a caliper body secured to a stationary portion of the vehicle and provided with suitable hydraulic connections for transmitting hydraulic pressure to and from the actuators. The caliper is shaped and located such that a portion of the wheel-mounted brake disc is received between the opposed actuators so that the actuators can apply braking pressure to the opposite side faces of the rotating disc when caused to hydraulically extend from the caliper upon application of the brakes.

The caliper may include a U-shaped body having a peripheral base portion with a pair of leg portions extending inwardly from the base portion and a slot defined between the leg portions for receiving the brake disc, the brake actuators being mounted in chambers formed in the leg portions. The chambers may be formed by openings extending through the leg portions, with cap members mounted on the outer surfaces of the leg portions to close one end of the openings and define a housing for the hydraulic actuators.

Hydraulic passages must be formed in the cap members, which passages in turn must communicate hydraulically with passages in the caliper body. For maintenance and repair of the hydraulic actuators, and replacement of worn or defective parts, the cap members are detachably mounted on the caliper body. In some circumstances, it may be necessary to replace the cap members. It may also be desirable to simultaneously remove and replace the cap members and hydraulic actuators. For example, a particular construction of hydraulic actuator may be factory mounted on a cap member for installation in a standard size caliper body so that the cap member and actuator are removed and replaced as a unit.

When a cap member is removed and replaced, the fluid connection between the hydraulic passages in the cap member and the hydraulic passages in the caliper body must of course be leakproof. Furthermore, the manufacturing tolerances for the cap member and caliper bodies must provide for interchangeability. Consequently, a fluid connection between the end cap and caliper body must be provided that is leakproof and will also accommodate a wide variation in dimensions in order to meet the interchangeability requirements.

U.S. Pat. application, Ser. No. 692,218, filed Dec. 20, 1967, now abandoned, discloses a bellows-type brake actuator for use in a closed hydraulic brake system. The actuator disclosed in the latter application has a corrugated side wall that is inelastically deformable. Accordingly, when the actuator is extended under pressure, the inelastic deformation of the corrugated side wall prevents the actuator from rebounding to its original length when the hydraulic pressure is removed so that brake lining wear is compensated for by the progressive increase in the relaxed length of the actuator.

The corrugated actuators disclosed in the application, Ser. No. 692,218 includes a beryllium copper actuator having a layer of elastomeric material bonded to at least one surface. This type of actuator may be mounted in a caliper assembly by clamping an end flange formed on the actuator between the end cap and caliper body. However, if the clamping pressure applied to the flange is excessive, the elastomeric layer may be stripped from the beryllium copper and the beryllium copper flange otherwise damaged, resulting in early failure of the actuator.

An object of this invention is to provide a leakproof fluid connection between detachably connected, interchangeable mating parts of a disc brake assembly that is simple in construction, easy to install, and can accommodate a wide variation in dimensional tolerances between the mating parts.

A further object is to provide a leakproof fluid connection and clamping arrangement between detachably connected parts of a disc brake assembly in which one of the parts has a flange clamped in position wherein excessive clamping pressure on the flange is prevented by a fluid connector extending between the parts applying clamping pressure and which is maintained in leakproof relationship with the parts by the clamping pressure.

Another object lies in the provision of a method of making a cap member to be mounted on a disc brake caliper body and hydraulically connected therewith wherein the cap member is provided with a combined locating member and fluid connector to both assist in locating the cap member on the caliper body for attachment thereto and providing a hydraulic or fluid connection between the cap member and caliper body after attachment of the cap member to the caliper body.

Another object is to provide hydraulic disc brake apparatus wherein a caliper body has a cap member mounted thereon with a fluid passage in the caliper body in communication with a fluid passage in the cap member wherein a fluid connector projects from the cap member to serve as a locating member for mounting the cap member on the caliper body and as a fluid connector between the passage in caliper body and the passage in the cap member after the cap member is secured to the caliper body.

Still another object is to provide a fitting or fluid connector that can be mounted between two mating parts to provide a fluid connection between the parts wherein the fluid connector has a self-contained sealing member engageable with surfaces on the mating parts to provide a leakproof connection.

A still further object is to provide a fitting or fluid connector that can be threadedly mounted on one of two mating parts and project into the other to provide a fluid connection between the two parts and which has a self-contained sealing member on its projecting portion engageable with a surface on the other part to provide a leakproof connection.

The foregoing, and other objects, are achieved according to the present invention by the provision of hydraulic disc brake apparatus including a caliper body with a cap member detachably secured to the caliper body and having a fluid passage which must be placed in communication with a fluid passage in the caliper body. The cap member overlies a side surface of the caliper body. A fluid connector projects between the main body and cap member to provide fluid communication between the passage in the caliper body and the passage in the cap member.

The fluid connector is formed with an endless side wall having a rim which projects into the caliper body, and a recess formed in the side surface of the main body has an end wall which surrounds a port in communication with the passage in the main body, the end wall of the recess forming a seat for the rim of the connector. An elastomeric sealing member is bonded to the rim of the connector and is compressed against the seat surrounding the port to prevent leakage. Projecting into the recess from the port is a cylindrical projection, and the rim of the connector may be received between the cylindrical projection and the side wall of the recess with a loose fit connection since sealing is accomplished by compression of the elastomeric sealing member against the end wall of the recess and does not require a tight or close fit between the connector and side wall of the recess.

In one embodiment of the invention, the connector is threadedly mounted in the cap member and includes a head portion with a cavity which is surrounded by the endless side wall, and a threaded shank portion which extends from the head portion and is threadedly mounted in the cap member. A transverse port in the shank portion of the connector communicates with the passage in the end cap. In accordance with the invention, the transverse port in the shank portion can be formed simultaneously with the drilling of the passage in the cap member when the fluid passage is drilled in the cap member. The drill penetrates the threaded connection between the cap member and connector to distort the threads and reduce the likelihood of the connector becoming disengaged from the cap member.

In another embodiment of the invention, the connector is not mounted on either the cap member or caliper body and has a rim on each end to which is bonded an elastomeric sealing member. In this embodiment, the connector extends into recesses in both the cap member and caliper body to provide a fluid coupling between the passages in the cap member and caliper body, the sealing members being compressed at each end to prevent leakage.

Other objects, advantages and features of the invention will become apparent from the following description taken in connection with the accompanying drawing in which:

FIG. 1a is an enlarged view of a detail of FIG. 1;

Figure 1:
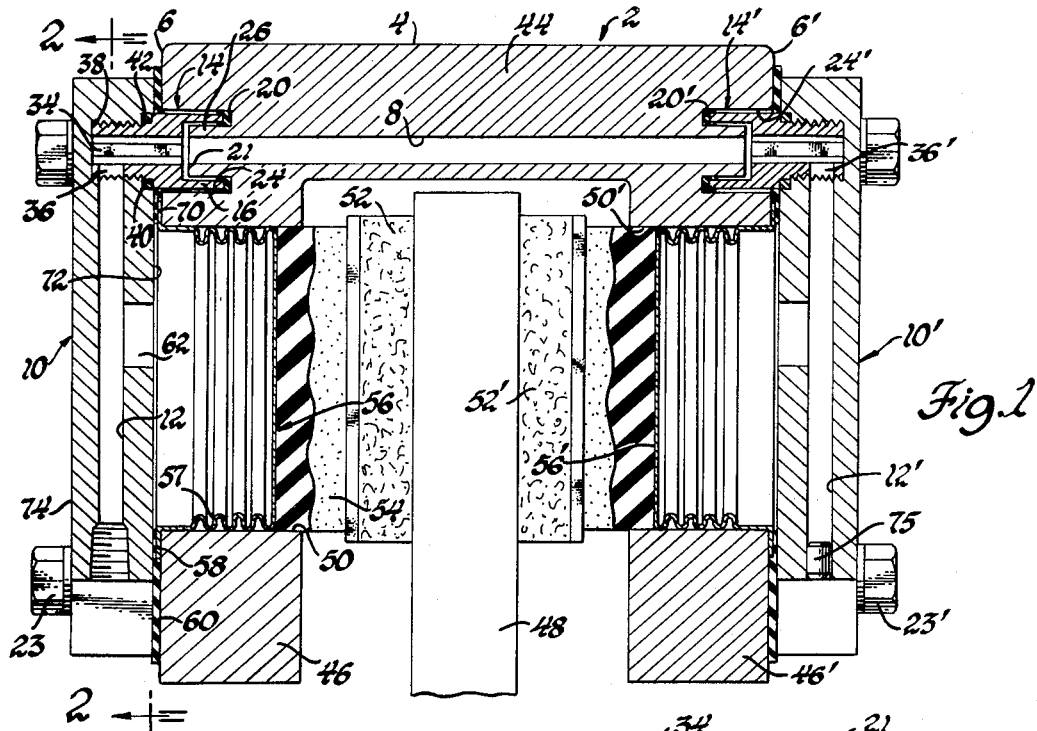
FIG. 1 is a sectional view of a disc brake assembly embodying the invention.
Figure 2:
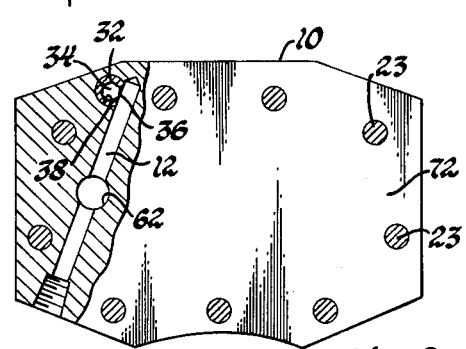
FIG. 2 is a view of the cap member of the assembly of FIG. 1 taken on line 2—2 of FIG. 1.
Figure 2A:
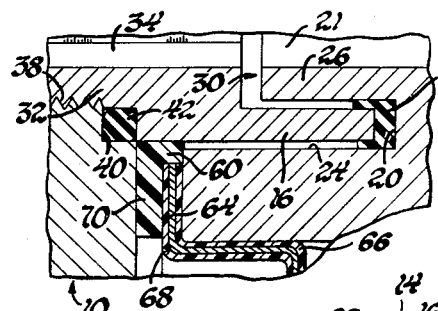

In FIG. 1, reference numeral 2 designates a disc brake caliper body having a top surface 4 and side surfaces 6 and 6' extending from the edge of the top surface. A fluid passage 8 is formed in the caliper body and cap members 10 and 10' overly the side surfaces 6 and 6' respectively, of the caliper body 2. Cap members 10 and 10' are of the same construction. Consequently, only cap member 10 will be described in detail. Features of cap member 10' corresponding to features of cap member 10 are identified by the same reference numerals except that the reference numerals for cap member 10' are primed, i.e., are followed by the mark ('). A fluid passage 12 is formed in cap member 10 and a fluid connector designated generally by reference numeral 14 projects between the caliper body 2 and the cap member 10 for providing fluid communication between the passage 8 in the caliper body and the passage 12 in the cap member.

The connector 14 includes an endless side wall 16 having a rim 18. A portion of connector 14 including rim 18 projects into the caliper body 2 and rim 18 is seated against a seat 20 formed in the caliper body. Seat 20 surrounds a port 21 which may either communicate with or define one end of passage 8. The cap member 10 is detachably secured to the caliper body by bolts 23. Bonded to the rim of the endless side wall 16 of connector 14 is an elastomeric sealing member 22 which is compressed against the seat 20 to prevent leakage by bolts 23.

Seat 20 is formed by the end wall of a recess 24 formed in the side surface 6 of the body 2, the recess being of larger cross-section than port 21 so that the seat 20 is defined by the portion of the end wall of recess 24 that surrounds the port 21. A cylindrical projection 26 extends into the recess and surrounds port 21, the rim 18 and elastomeric member 22 being received between the cylindrical projection 26 and the side wall of recess 24. As shown in FIG. 1, the side wall 16 of the connector 14 may have a loose fit relationship with the recess 24 and projection 26 to accommodate a wide variation in dimensions of the recess and projection since compression of the elastomeric member 22 against seat 20 provides the necessary leakproof seal. The projection 26 cooperates with the side wall of the recess 24 to provide an annular groove for receiving the connector 14.

Figure 3:
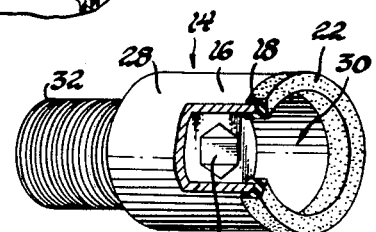
FIG. 3 is a perspective view of a fluid connector and locating member according to the invention.

With reference to FIG. 3, the fitting or connector 14 includes a head portion 28 with a cavity 30 formed in the head portion 28 and surrounded by the side wall 16. Projecting from the end of the head portion 28 is a threaded shank portion 32. Formed in the shank portion 32 is a passage 34 which communicates at one end with cavity 30. As shown in FIG. 3, the passage 34 is of hexagonal or other non-circular configuration to receive a tool of complementary shape for rotating the connector 14 to install it in the cap member 10.

A tapped hole 38 is formed in cap member 10 for receiving the threaded shank portion 32 of the connector 14. As shown in FIG. 1, passage 34 in the shank portion 32 communicates with passage 12 and cap member 10 through a transverse port 36 formed in the shank portion of the connector 14. The outer end of the threaded hole 38 is surrounded by an annular groove formed in the surface of the end cap which surrounds the connector 14 when the connector is installed on cap member 10, and an elastomeric sealing member 42 is received in groove 40 and retained therein by the head portion 28 of connector 14 since the head portion projects outwardly from the shank portion 32 at its juncture therewith.

As shown in FIG. 1, the caliper body 2 is of U-shaped configuration and includes a base portion 44 and a pair of leg portions 46 and 46' with a slot defined between the leg portions for receiving a wheel-mounted brake disc 48. Openings 50 and 50' are formed respectively in leg portions 46 and 46' for receiving actuating assemblies for causing brake pads 52 and 52' to apply braking pressure to opposite surfaces of the brake disc 48. The brake actuating assembly shown in FIG. 1 includes a piston member 54 engaged with the end wall 56 of a bellows-type actuator having corrugated side walls 57, and an end flange 58 which is clamped between the cap member 10 and side surface 6. A resilient gasket 60 is received between the cap member and side surface 6 to provide a fluid-tight seal. Cap member 10 is formed with a port 62 to provide communication between passage 12 and the interior of the actuator 56. Consequently, an increase in pressure in passage 12 is transmitted through port 62 to the actuator 56 to extend the brake pad 52 into braking engagement with disc 48.

As shown in FIG. 1a, the flange 58 of the actuator 56 may include a layer 64 of beryllium copper or other metal and an inner and outer layer 66 and 68 of elastomeric material. The periphery of the gasket 68 adjacent the periphery of opening 50 is cut away as shown at 70 in FIG. 1a to define a peripheral portion 70 of reduced thickness, and the flange 58 of the actuator 56 is received between the reduced thickness portion 70 and side surface 6 of the caliper body. The cutaway portion, or portion of reduced thickness 70 of the gasket 60, together with the elastomeric sealing member 22 prevents the application of excessive clamping pressure on the flange 58 when the bolts 23 are tightened to secure the cap member to the caliper body.

The cap member 10 and connector 14 are installed as a unit onto the caliper body 4. In the manufacture of the cap member 10, the threaded opening 38 may be first formed in the cap member and the annular groove 40 formed in the inner surface 72 of the cap member. The sealing member 42 and connector 14 may then be mounted on the cap member with the head portion 28 projecting from the inner surface 72 of the cap member. Passage 12 may then be drilled in the cap member between the inner and outer surfaces 72 and 74 until the tool drilling the passage penetrates the threaded wall of the connector 14 to form the transverse passage 36, and at the same time distort the threads of opening 38 and of the shank of the connector to jam the connector against rotation and thereby reduce the likelihood of the connector becoming disengaged from the cap member. Consequently, the connector 14 projects from the inner surface 72 of the cap member and serves as a locating member for positioning the cap member relative to the side surface 6 of the caliper body.

Gasket 60 is provided with an opening for receiving the connector 14, and the connector may be received in the recess 24 with a loose fit so as to accommodate a wide variation in the manufacturing tolerances of the recess 24. When the bolts 23 are tightened to secure the cap member 10 to the caliper body, the sealing ring 22 on rim 18 of the connector is compressed against the seat 20 to provide a leakproof seal between the connector and caliper body.

As shown in FIG. 1, passage 12' is closed by a plug member 75. Passage 12 in cap member 10 may be hydraulically connected with the master cylinder of a vehicle brake system so that when the brakes are applied, actuators 56 and 56' simultaneously extend to apply braking pressure to the disc 48 through the brake pads 52 and 52' since passage 12' communicates hydraulically with passage 12 through passage 8 and the connectors 14 and 14'.

Thus, in the embodiment of FIG. 1, connector 14 serves as a fluid connector and locating member comprising a body defined by portions 28 and 32 with means 30, 34 defining an opening in the body extending from one end 18 of the body toward the other end with external threads formed on portion 32 of the body and surrounding at least a portion of the opening; and an endless elastomeric sealing member 22 is bonded to the rim 18 surrounding the opening.

When the connector 14 is secured to the cap member 10 by the method described above, the cap member and connector can be removed and replaced as a unit in the assembly of FIG. 1. Consequently, the disc brake construction according to the invention includes a cap member 10 having inner and outer surfaces 72 and 74 with an opening 38 in the cap member communicating with the inner surface 72; a fluid connector and locating member 14 having a shank portion 32 mounted in opening 38 and a head portion 28 projecting from the inner surface 72; means 30, 34 defining a passage in the fluid connector extending through the head portion 28 and at least a part of the shank portion 32; and a passage 12 defined in the end cap 10 between the inner and outer surfaces 72 and 74, passage 12 extending through the wall of the shank portion 32 at 36 into communication with the passage 34 in the fluid connector 14.

The disc brake apparatus of FIG. 1 further comprises a caliper body 2 having a peripheral base portion 44 for overlying the peripheral edge of a rotatable brake disc 48, and a leg portion 46 extending from one side of the base portion 44 so as to extend alongside one of the side surfaces of the rotatable brake disc 48; a recess 24 formed in one side 6 of the base portion 44; a fluid passage 8 in base portion 44 having one end 21 in communication with recess 24, the fluid passage 8 having a smaller cross-section than the recess 24 such that the end wall of the recess surrounds the end 21 of the fluid passage; an actuator opening 50 formed in the leg portion 46; an end cap 10 mounted on the base member and overlying the actuator opening 50; a fluid connector 14 projecting from the end cap 10 into recess 24; the connector 14 having an endless side wall 16 and an elastomeric sealing member 18 bonded to the rim 22 thereof and engaged with the end wall of the recess 24; a resilient gasket 60 received between end cap 10 and the caliper body 4; gasket 60 having an opening co-extensive with the actuator opening 50 and being cut away at its periphery surrounding the actuator opening 50 such that the inner peripheral portion 70 of the gasket surrounding the actuator opening 50 is of reduced thickness; an actuator member 56 in the actuator opening 50 having a flange 58 projecting between the reduced thickness portion 70 of the gasket and the caliper body.

Figure 4:
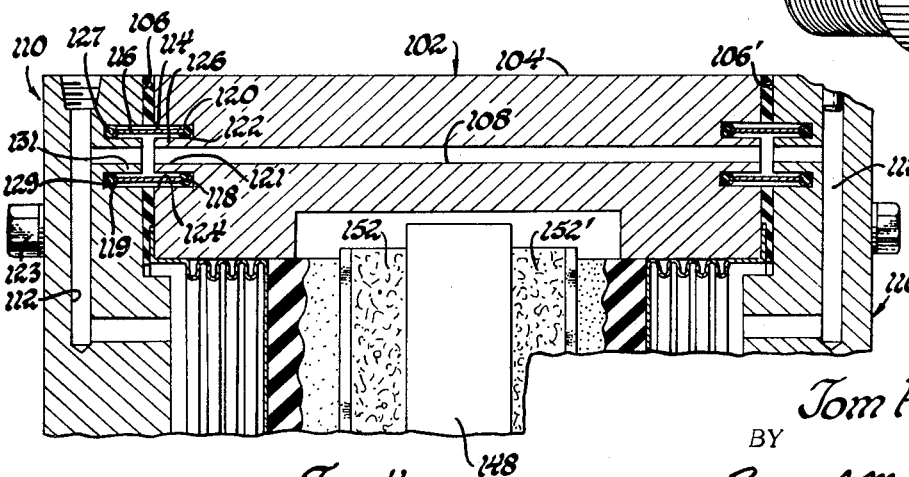
FIG. 4 is a sectional view similar to FIG. 1 of an alternative construction embodying the invention.

In the embodiment of FIG. 4, reference numeral 102 designates a disc brake caliper body having a top surface 104 and a side surface 106 extending from the edge of the top surface. A fluid passage 108 is formed in the caliper body 102, and a cap member 110 overlies the side surface 106 of the caliper body 102. A fluid passage 112 is formed in cap member 110 and a fluid connector designated generally by reference numeral 114 projects between the caliper body 102 and the cap member 110 for providing fluid communication between the passage 108 in the caliper body and the passage 112.

Connector 114 includes an endless side wall 116 having a rim 118. Connector 114 projects into the caliper body 102 and rim 118 is seated against a seat 120 which surrounds a port 121 which may either communicate with passage 108 or define one end of passage 108. Cap member 110 is detachably secured to the caliper body 102 by bolts 123. Bonded to the rim of the endless side wall 116 of connector 114 is an elastomeric sealing member 122 which is compressed against the seat 120 to prevent leakage by bolts 123.

Seat 120 is formed by the end wall of a recess 124 formed in the side surface 106 of the caliper body, the recess 124 being of larger cross-section than port 121 so that seat 120 is defined by the portion of the end wall of recess 124 that surrounds port 121. A cylindrical projection 126 extends into the recess and surrounds port 121, the rim 118 and elastomeric sealing member 122 being received between the cylindrical projection 126 and the side wall of recess 124. As shown in FIG. 4, the side wall 116 of connector 114 may have a loose fit relationship with recess 124 and projection 126 to accommodate a wide variation in the dimensions and location of the recess and projection.

The cylindrical connector 114 in the embodiment of FIG. 4 has a rim 119 which projects into the cap member 10 and has a sealing member 127 bonded thereto which is seated against the seat 129 surrounding a port communicating with passage 112. A cylindrical projection 131 surrounds the port and projects into the recess defined in the cap member in substantially concentric relationship with the recess 124 defined in the caliper body. The sealing members 122 and 127 are compressed against the respective seats 120 and 129 to provide a leakproof fluid connection between the cap member 110 and caliper body 102 when bolts 123 are tightened to secure the cap member to the caliper body. The construction of the embodiment of FIG. 4 is otherwise the same as that shown in FIG. 1.

While specific embodiments of the invention have been illustrated and described in the foregoing specifications and accompanying drawings, it should be understood that the invention is not limited to the exact construction shown, but that various alternatives in the construction and arrangement of parts, all falling within the scope and spirit of the invention, will be apparent to those skilled in the art.

I claim:

1. Hydraulic disc brake construction comprising: a caliper body member having a top surface and a side surface extending from one edge of said top surface; a fluid passage in said body; a cap member overlying at least a portion of said side surface; a fluid passage in said cap member; a fluid connector projecting between said body and cap members and providing fluid communication between the passage in said body and the passage in said cap member, said connector including an endless side wall having a rim projecting into said body member; a recess formed in the side surface of said body member and having an end wall defining a seat for said rim and being of larger cross-section than said rim such that said rim is received in said recess in loose-fit relationship therewith; a port communicating with the end wall of said recess and with said fluid passage in said body member, said port being smaller than said recess such that said seat is defined by the end wall of said recess surrounding said port; and an endless elastomeric sealing member interposed between said rim and said seat.

2. Hydraulic disc brake construction comprising: a caliper body member having a top surface and a side surface extending from one edge of said top surface; a fluid passage in said body; a cap member overlying at least a portion of said side surface; a fluid passage in said cap member; a fluid connector projecting between said body and cap members and providing fluid communication between the passage in said body and the passage in said cap member, said connector including an endless side wall having a rim projecting into said body member; a recess formed in the side surface of said body member and having an end wall defining a seat for said rim; a port communicating with the end wall of said recess and with said fluid passage in said body member, said port being smaller than said recess such that said seat is defined by the end wall of said recess surrounding said port; an endless elastomeric sealing member interposed between said rim and said seat; a cylindrical projection extending into said recess from said port, said rim and elastomeric member being received between said cylindrical projection and the side wall of said recess.

3. Hydraulic disc brake construction as claimed in claim 2 further including a resilient gasket received between said cap member and side surface; said gasket being cut away at its periphery to define a peripheral portion of reduced thickness; and a brake actuating component having a flange received between said reduced thickness portion and one of said end cap and caliper body.

4. Hydraulic disc brake construction as claimed in claim 3 wherein the flange of said component is of metal and is coated on at least one surface with elastomeric material.

5. Hydraulic disc brake construction as claimed in claim 2 wherein said connector has a loose fit relationship with said recess.

6. Hydraulic disc brake construction as claimed in claim 5 wherein said sealing member is bonded to said rim.

7. Hydraulic disc brake construction as claimed in claim 6 wherein said connector is threadedly mounted in said cap member.

8. Hydraulic disc brake construction as claimed in claim 7 wherein said connector includes a head portion with a cavity therein surrounded by said endless side wall, and a threaded shank portion extending from the end of said head portion opposite said rim.

9. Hydraulic disc brake construction as claimed in claim 8 including a passage through said shank portion communicating at one end with said cavity.

10. Hydraulic disc brake construction as claimed in claim 9 including a transverse port in said shank portion communicating with the passage in said cap member.

11. Hydraulic disc brake construction as claimed in claim 10 including an annular groove in said end cap surrounding said shank, and an elastomeric sealing member received in said groove and retained therein by said head portion.

12. Hydraulic disc brake construction as claimed in claim 11 wherein the passage in said shank portion is of noncircular cross-section.

13. Hydraulic disc brake construction as claimed in claim 2 wherein the endless side wall of said connector has a rim projecting into said cap member, and including means defining a seat in said cap member for said last named rim.

14. Hydraulic disc brake construction as claimed in claim 13 including a port surrounded by the seat in said caliper body and communicating with the passage in said caliper body, and a port surrounded by the seat in said cap member and communicating with the passage in said cap member.

15. Hydraulic disc brake construction as claimed in claim 14 including an endless elastomeric sealing member interposed between each rim and its associated seat.

16. Hydraulic disc brake construction as claimed in claim 15 wherein a recess is formed in said side surface and a recess is formed in said cap member, the port in said caliper body communicating with the end wall of the recess in said side surface and the port in said cap member communicating with the end wall of the recess in said cap member, said recesses being of larger cross-section than the respective ports, and said seats are defined by the end walls of the recesses surrounding the respective ports.

17. Hydraulic disc brake construction as claimed in claim 16 further including a cylindrical projection extending into each recess from the respective ports, said rims and elastomeric members being received between the respective cylindrical projections and side walls of said recesses.

18. Hydraulic disc brake construction as claimed in claim 17 wherein said connector has a loose fit relationship with said recesses.

19. Hydraulic disc brake construction as claimed in claim 18 wherein each sealing member is bonded to the respective rim of said connector.

20. Hydraulic disc brake construction as claimed in claim 19 further including a resilient gasket received between said cap member and side surface; said gasket being cut away at its periphery to define a peripheral portion of reduced thickness; and a brake actuating component having a flange received between said reduced thickness portion and one of said end cap and main body.

21. Hydraulic disc brake construction as claimed in claim 20 wherein the flange of said component is of metal and is coated on at least one surface with elastomeric material.

* * * * *